(12) United States Patent
Mahoney et al.

(10) Patent No.: US 10,738,811 B2
(45) Date of Patent: Aug. 11, 2020

(54) CLAMPING CLINCH FASTENER

(71) Applicant: Penn Engineering & Manufacturing Corp., Danboro, PA (US)

(72) Inventors: Michael J. Mahoney, Doylestown, PA (US); Robert P. Smith, New Tripoli, PA (US)

(73) Assignee: Penn Engineering & Manufacturing Corp., Danboro, PA (US)

( * ) Notice: Subject to any disclaimer, the term of this patent is extended or adjusted under 35 U.S.C. 154(b) by 906 days.

(21) Appl. No.: 15/203,775

(22) Filed: Jul. 6, 2016

(65) Prior Publication Data
US 2017/0009793 A1 Jan. 12, 2017

Related U.S. Application Data

(60) Provisional application No. 62/188,980, filed on Jul. 6, 2015.

(51) Int. Cl.
*F16B 5/04* (2006.01)
*F16B 5/06* (2006.01)
*F16B 19/08* (2006.01)
*B21J 15/04* (2006.01)

(52) U.S. Cl.
CPC .............. *F16B 5/04* (2013.01); *F16B 5/0642* (2013.01); *F16B 19/08* (2013.01); *B21J 15/041* (2013.01); *Y10T 403/4991* (2015.01)

(58) Field of Classification Search
CPC ........ B21J 15/04; B21J 15/041; F16B 5/0096; F16B 5/0084; F16B 5/0088; F16B 5/04; F16B 5/0642; F16B 11/002; F16B 17/006; F16B 17/008; F16B 19/08; F16B 19/10; F16B 2019/1018; Y10T 403/49; Y10T 403/4916; Y10T 403/4949; Y10T 403/4966; Y10T 403/4991; Y10T 403/74; Y10T 403/75
USPC .... 403/274, 276, 280, 282, 285, 404, 408.1; 411/501
See application file for complete search history.

(56) References Cited

U.S. PATENT DOCUMENTS

| | | | |
|---|---|---|---|
| 7,048,463 B2 * | 5/2006 | Babej | B23P 19/062 403/278 |
| 9,890,805 B2 * | 2/2018 | Schneider | F16B 5/04 |
| 10,293,428 B2 * | 5/2019 | Spinella | B23K 35/28 |

FOREIGN PATENT DOCUMENTS

EP 1508429 A1 * 2/2005 ........... B29C 65/601

* cited by examiner

*Primary Examiner* — Josh Skroupa
(74) *Attorney, Agent, or Firm* — Gregory J. Gore, Esq.

(57) ABSTRACT

A clinch fastener with a single-element, unitary construction that does not require the preassembly of parts. The fastener provides a clamp load after installation and is fully formed by stamping the part from sheet metal. The fastener provides the necessary rigidity for a clinch attachment shank with the resilience of a head that will provide a residual clamp load to the attached panels. The fastener attaches two panels face-to-face by extending through aligned apertures in the panels. A shank undercut receives the cold flow of material from the second bottom panel while the panels are clamped against a resilient dome-shaped head of the fastener. The fastener may include a central axial well that receives the tip of a press punch during installation.

13 Claims, 4 Drawing Sheets

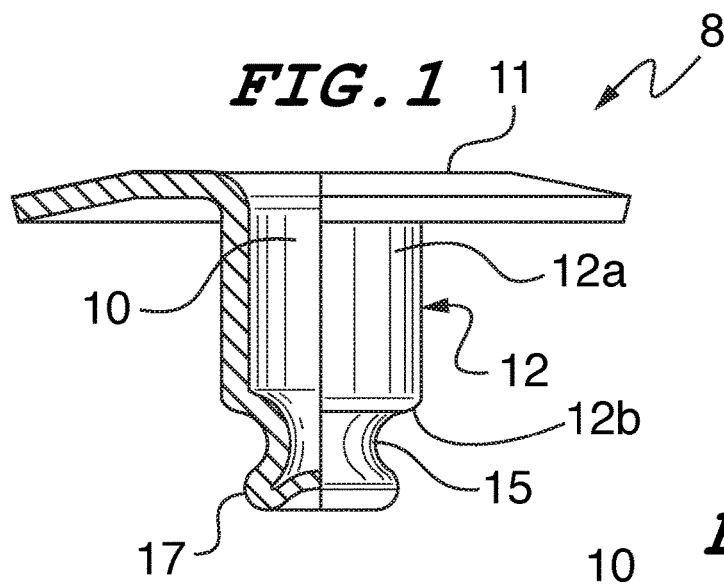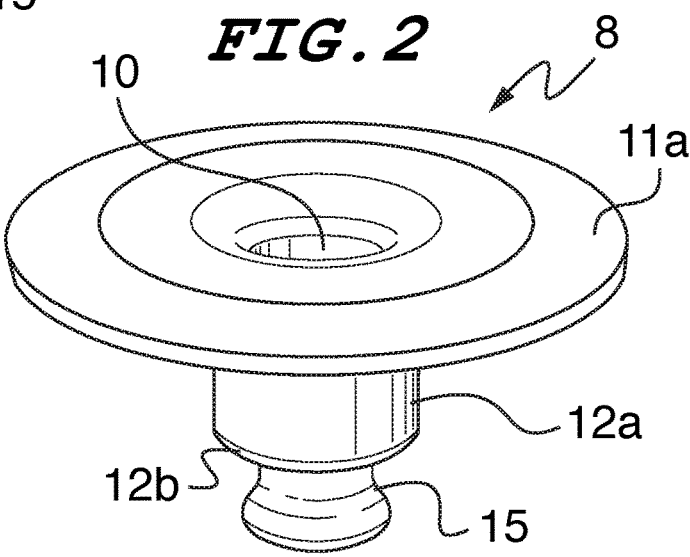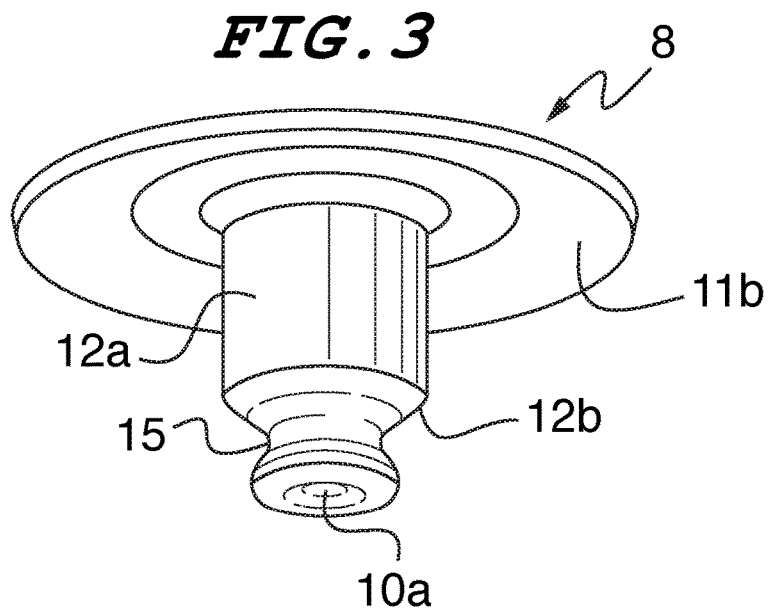

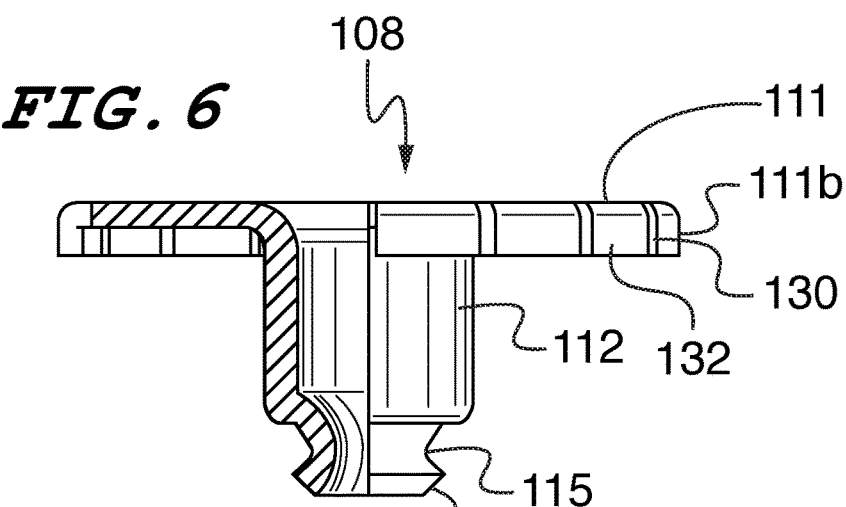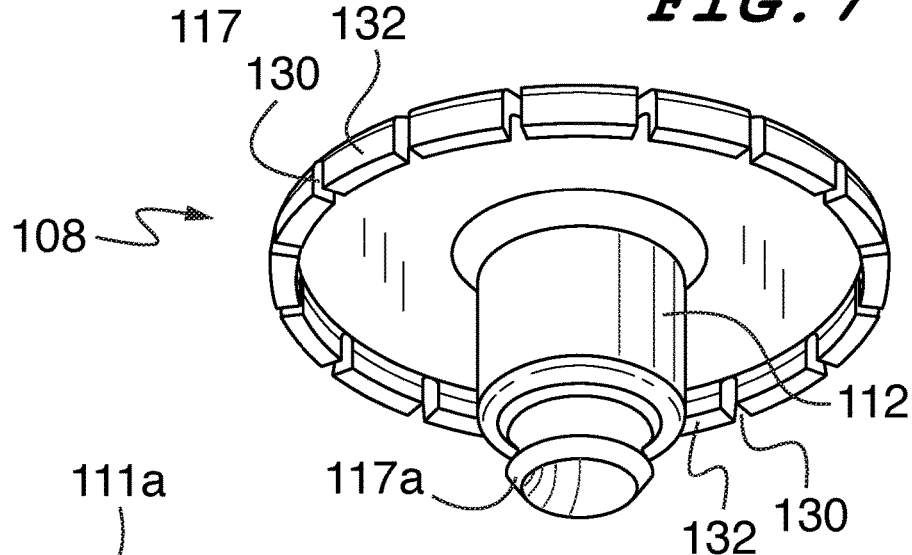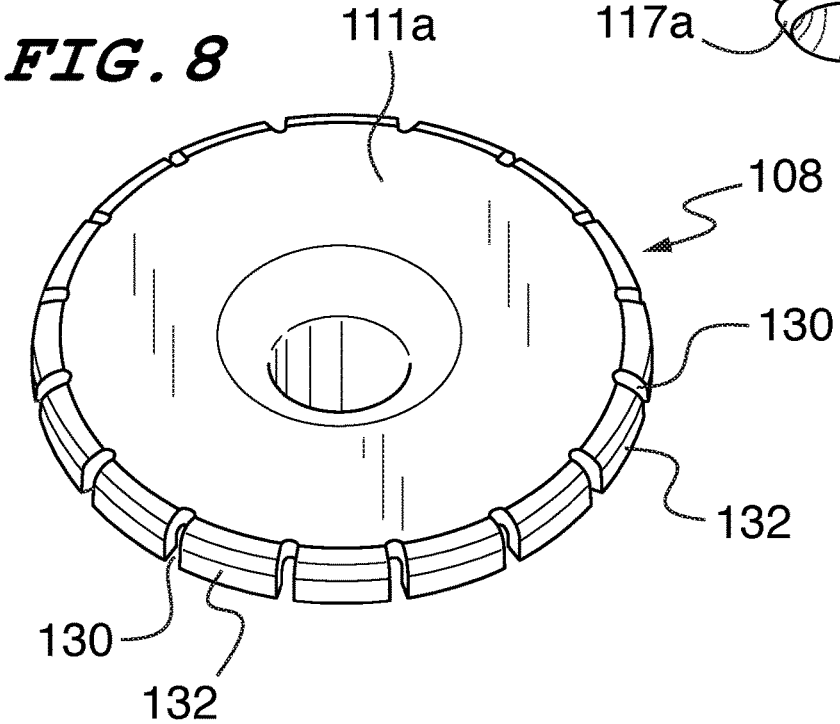

CLAMPING CLINCH FASTENER

RELATED APPLICATIONS

This application is a non-provisional patent application of U.S. provisional patent application No. 62/188,980, entitled Clinch Tack Pin, filed Jul. 5, 2016, priority from which is hereby claimed.

FIELD OF THE INVENTION

The present invention relates to clinch-type fasteners for joining abutting panels. More particularly, the invention relates to clinch fasteners having a head that applies a residual clamp load to the joined panels.

BACKGROUND OF THE INVENTION

Tack pins are relatively new and are widely used in the field of consumer electronics. Tack pins are generally very small, for example, having a shank diameter of around 1.0 mm. Their miniature size and ability to provide a reliable attachment force has generally replaced screws.

Tack pins connect overlapping panels by permanently deforming the panel material surrounding the hole in which the tack pin is installed. During installation, the shoulder on the tack pin shank, which has a diameter larger than the lower panel hole diameter, vertically compresses (deforms) and forces lower panel material into an undercut in the shank. The lower panel material firmly clinches the shank at the undercut and locks the tack pin in place.

For improved attachment, compression installed fasteners such as a miniature tack pins should preferably apply a residual clamp load to the attached panels. Typically, the head of a tack pin is flat and extends generally perpendicularly to the longitudinal axis of the shank. Because the head is flat, it does not elastically deform during installation to provide a residual clamp load on the panels. It has been proposed to provide a tack pin with an enlarged head having the desired resilience characteristics. However, since tack pins must be significantly harder than the materials to which they attach, providing a tack pin head with the desired resilience is difficult to achieve. For example, joining a fastener head composed of one material to a shank composed of a second material requires an extra manufacturing step. Furthermore, the shanks are very small and very difficult to physically handle. Therefore, it would be desirable to provide a tack pin with resilience features that apply a residual clamp load to the attached panels after installation.

U.S. provisional patent application No. 62/113,846 entitled "Assembled Clamp Tack" discloses a fastener formation process in which separate components are joined simultaneously with formation of the main body of the fastener. More specifically, a head element is joined to the shank while the shank features are formed from a blank. The manufacturing process is carried out by a punch-and-die combination in a single pressing stroke. While this preassembly step solves the problem of handling miniature parts when the head and shank comprise separate components, it still requires an assembly step. Therefore, it would be desirable to provide a tack pin that applies a residual clamp load to the attached panels after installation but does not require the step of assembling separate head and shank components.

SUMMARY OF THE INVENTION

The novel clinch fastener has a unique design and improved functionality compared to the prior art. A fastener in accordance with a preferred embodiment of the invention has a single-element, unitary construction that does not require the preassembly of parts. The fastener joins two panels face-to-face. In one preferred embodiment, the fastener has a clamp tack feature that provides a residual clamp load after installation. In one preferred embodiment, the clamp tack feature is provided by a novel head design that incorporates a spring feature, which provides clamp load capability and increased vertical installation tolerance.

Preferably, the fastener is fully formed by stamping from sheet metal. Furthermore, the fastener provides the necessary rigidity for a clinch attachment shank with the resilience of a head that will provide a residual clamp load to the attached panels. The fastener is made from a material that ensures both of these functional aspects are achieved. The fastener is installed using specially-designed tooling novel tooling to transport, position, support and install the fastener within two abutting panels.

In one preferred embodiment, the fastener comprises a dome-shaped head at a top end. The head has a radially-extending skirt with a downwardly-extending periphery. A shank with a shoulder is fixed to and extends downwardly from the head. An undercut is located immediately below the shoulder. An arcuate bulbous portion is located immediately below the undercut at a bottommost end of the shank. A central axial well extends from an opening at the top of the head to the bottom of the shank. The skirt of the head is characterized by shape memory elasticity. The bottom of the head has a leading edge of greater diameter than the diameter of the shank, and terminates at a downward-folded periphery. The downward-folded periphery may have radial slots, which are open at the circumferential edge of the skirt and are located between downwardly-extending fingers of the skirt. The skirt may also have a tapered, arcuate, axial cross-section and be composed of an alloy that has high elasticity and can be formed by stamping sheet metal.

In one preferred embodiment, the fastener can be used as part of an assembly comprising a first top panel and a second bottom panel. Each panel has an aperture extending therethrough. The panels are positioned face-to-face with each aperture being coaxially aligned. The fastener extends through the apertures with the skirt in contact with a top side of the first panel and the shank rigidly affixed to the second panel. Resilience of the skirt applies a residual clamp load to the joined panels. The fastener is joined to the second panel when a shoulder on the fastener shank displaces material around the aperture in the second panel, which cold flows into an undercut on the shank.

In a further preferred embodiment, the fastener is installed using a novel installation method and novel tooling. The fastener is installed using a press punch having two different press surfaces, namely, the annular shoulder and a distal tip that extends downward below the shoulder. During installation, the tip is inserted in and occupies the central axial well. In combination, the shoulder of the punch presses on the fastener head while the punch tip occupies the well. As the wall of the shank compresses under the load of the press punch, the punch tip engages and presses on the inner surface of the undercut and shoulder of the shank. In one preferred embodiment, the pressing surface of the punch has vacuum ports for applying an attachment force to the fastener head. The fastener well preferably extends substantially the entire length of the fastener while the punch tip extends substantially the entire length of the well. The well may be a cylindrical blind bore closed at the bottom.

These and other objects and advantages will be apparent from the following drawings and description of preferred embodiments. Before explaining several embodiments of the invention in detail, it is to be understood that the invention is not limited in its application or to the details of construction in the following description or illustrated in the drawings. The invention includes other embodiments and can be practiced in various ways.

BRIEF DESCRIPTION OF THE DRAWINGS

FIG. 1 is a side elevation in partial section of a fastener in accordance with one preferred embodiment of the invention;

FIGS. 2 and 3 are top and bottom perspectives, respectively, of the fastener shown in FIG. 1;

FIG. 6 is a side elevation in partial section of a fastener in accordance with another preferred embodiment of the invention;

FIGS. 7 and 8 are bottom and top perspectives, respectively, of the fastener shown in FIG. 6;

DETAILED DESCRIPTION OF PREFERRED EMBODIMENTS

Figure 4:
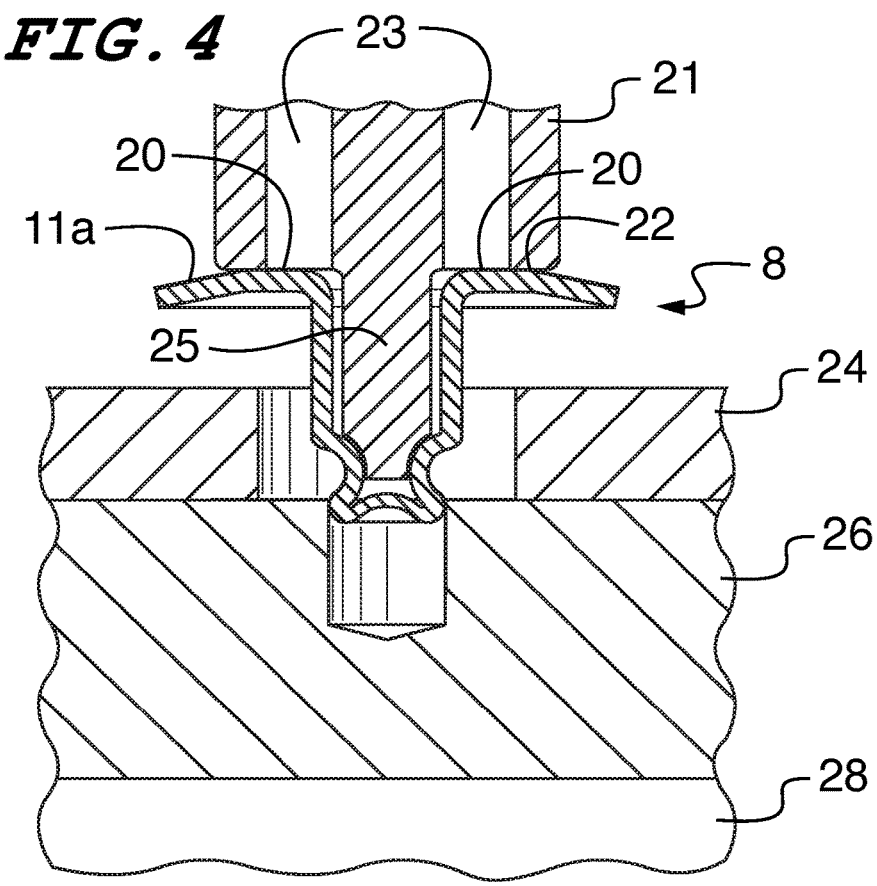
FIGS. 4 and 5 are cross sections of the fastener of FIG. 1 shown during sequential steps of the installation process in a panel assembly.

A fastener in accordance with a preferred embodiment is shown in FIGS. 1-3 and is designated generally by reference numeral 8. The fastener 8 generally comprises a spring head 11 and a shank 12 fixed to and extending transversely from the head 11. The head 11 has a domed shape with a peripheral edge, a generally-concave underside surface 11b and a generally-convex upperside surface 11a. The shank 12 extends from the concave surface 11b. As further described below, the head 11 resiliently deflects under a compressive load to provide a residual clamp load to the panels after installation.

The shank 12 has a cylindrical base portion 12a fixed to the head 11, an undercut portion 15 distally adjacent the base portion 12a, and a bulbous end portion 17, all of which are preferably integrally-formed together. A shoulder 12b is formed at the distal end of the base portion 12a intermediate the undercut 12b. The shoulder 12b may have a rounded shape such as shown in FIGS. 1-3 or a more angularly-tapered shape. In preferred embodiments, the diameter of the base portion 12a is selected so that it is smaller than diameter of the hole in the upper panel 24 to provide clearance between the two. The diameter of the base portion 12a is also selected so that it is larger than the hole in the bottom panel 26, which causes the shoulder to impinge on the lower panel when the fastener 8 is installed. Then, when the fastener 8 is urged downwardly by a punch, the shoulder 12b acts as a displacer, deforms the bottom panel material, and causes the cold flow of material from the bottom panel 26 into the undercut 15. The shank 12 is preferably long enough to provide clearance for the top panel 24.

A bulbous end portion 17 of the shank 12 is fixed to and preferably integrally-formed with the undercut 15. The diameter of the bulbous end portion 17 is generally larger than the diameter of the undercut to provide pull-out resistance. The distal end 17a of the bulb 17 is preferably rounded or tapered to facilitate insertion of the fastener 8 through the panel holes.

As seen in FIGS. 1-3, a central axial well or bore 10 extends the length of the fastener 8. In this preferred embodiment, the well 10 is a cylindrical blind bore closed at the bottom 10a.

The cross section of the shank 12 and head 11 are generally circular along their entire axial length, although the diameter varies along its length.

Figure 5:
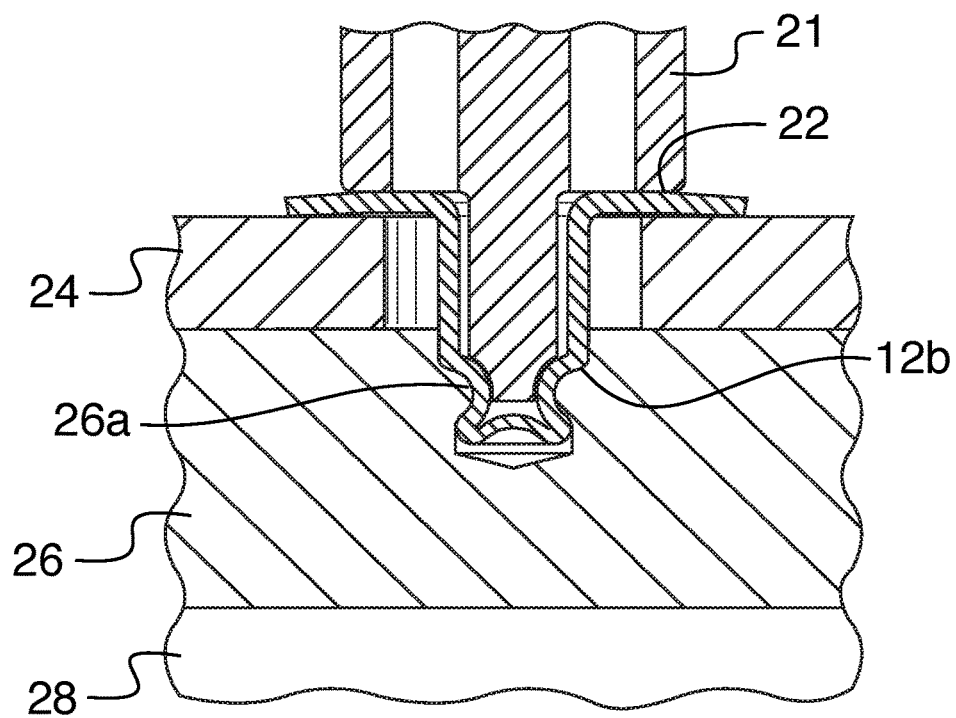

FIGS. 4 and 5 illustrate the installation process for the fastener 8, and the relationship between head deflection and bottom panel material deformation into the undercut that together create the clamp load on the panels 24, 26. As an example, the fastener shown in these figures is being installed into a 1 mm diameter mounting hole. The head diameter is approximately 2.5 mm. In FIG. 4, the fastener 8 is shown inserted through the hole in the top panel 24 but resting on the hole perimeter of the bottom panel 26. A punch 21 is installed in the central well 10 of the fastener 8 and in contact with the upperside 11a of the head 11. In this position, the punch is primed to force the fastener into the bottom panel hole, which is supported by an anvil 28. The punch 21 has a specialized construction including vacuum ports 23 and a tip 25 that extends into the central bore 11 of the fastener 8. The punch also has the following features and performs the following functions:

The tip 25 enters the well of the fastener 8 and maintains fastener-to-punch concentricity during installation.

The vacuum ports 23 keep the fastener 8 on the punch during installation.

The shoulder 22 of the punch presses on the head 11 of the fastener to install it.

FIG. 5 shows the fastener 8 after installation. During downward plunging by the punch 21, the shoulder 12b of the fastener 8 forces material surrounding the bottom panel hole into the undercut 15. At this point, the shank base wall 12a can shorten slightly, due to the compressive force on the fastener during installation. The punch tip 25 within the well 10 acts as a safety against crushing of the fastener 8 if the installation forces become too great. This value varies due to panel material hardness. Once the shank base wall 12a shortens a bit due to the compressive force of the punch 21, the tip of the punch contacts the shoulder 12b to help distribute some of the installation load off of the shank base wall 12a to complete the installation. This can only happen if the bottom panel is soft enough to yield prior to the shank wall compression. But if the wall does compress, the punch configuration 21 guarantees that the installation will be successful and makes the thin-walled shank function acceptably.

Once the undercut is filled and the punch is retracted, the fastener 8 is in tension between the upward force of the spring head 11, and the material 26a filling the undercut 15. At this point, the failure mode of the fastener 8 in pull-out (tension) will be the shearing of the material 26a in the undercut 15, as all of the remaining structure of the fastener will exceed the pull-out force. This mode is typical with solid tack pins. The fastener of FIGS. 1-5 is preferably made by stamping from a material such as UNS-C72900 copper alloy, which has a very high yield stress and high elasticity.

FIGS. 6-8 show an alternative embodiment of the invention 108 having a slotted head 111. The head 111 has a generally planar base 111a with an annular rim 111b. The fastener 8 includes a shank 112 fixed to and extending transversely from the head 111. The shank 112 generally has the same construction as the shank 12 described above with respect to the embodiment of FIGS. 1-5, including an undercut 115 and an end portion 117. The rim 111b projects axially toward the end portion 117 of the shank 112. A plurality of equally-spaced slots 130 in the rim serrate the rim 111b into a plurality of segments 132. In this embodiment, the distal end 117a of the end portion 117 is not bulbous; instead it is planar but angled to facilitate insertion of the fastener 108 through the panel holes.

Figure 9:
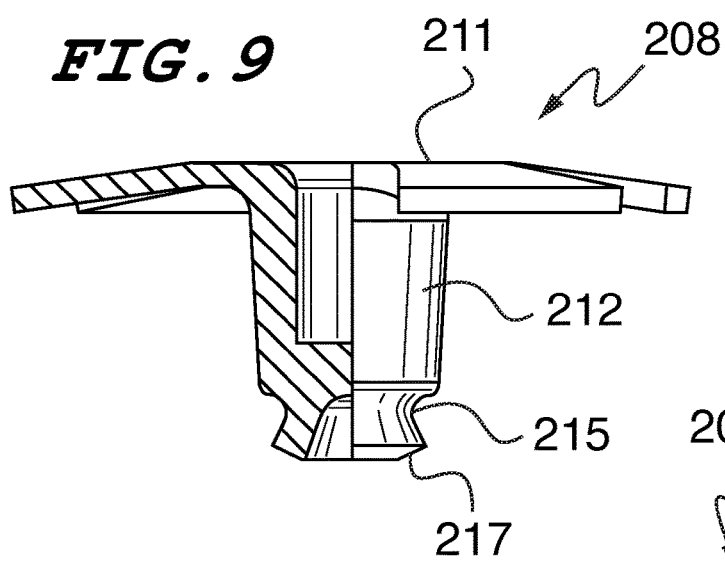
FIG. 9 is a side elevation in partial section of a fastener in accordance with a further preferred embodiment of the invention; and, FIGS. 10 and 11 are top and bottom perspectives, respectively, of the fastener shown in FIG. 9.
Figure 10:
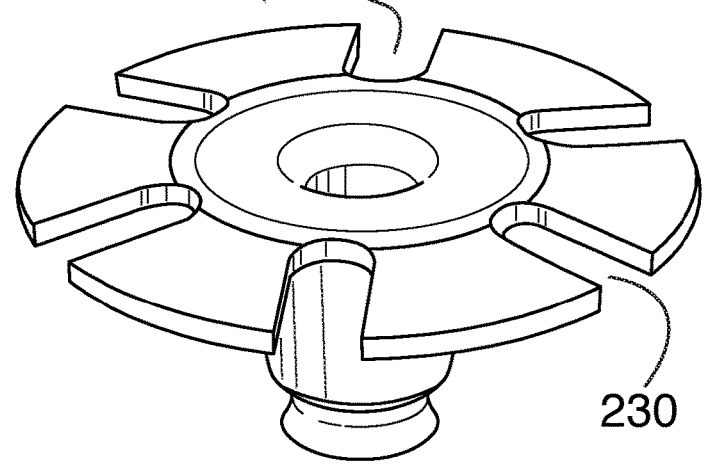
Figure 11:
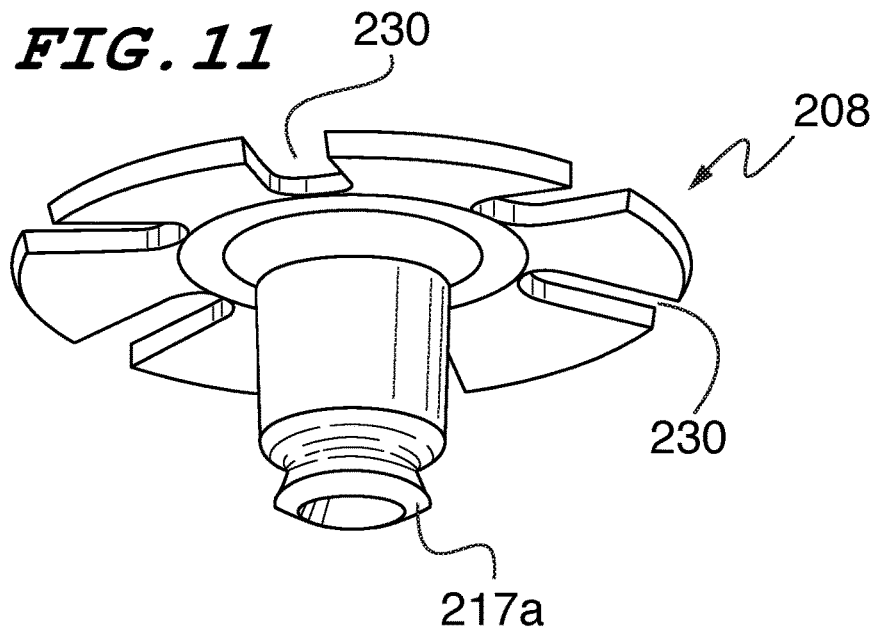

FIGS. 9-11 show another embodiment 208 of the invention having a domed head 211 similar to the embodiment of FIGS. 1-5. The fastener 208 includes a shank 212 fixed to and extending transversely from the head 211. The shank 212 generally has the same construction as the shank 112 described above with respect to the embodiment of FIGS. 6-9, including an undercut 215 and an end portion 217. However, in this embodiment, the head 211 includes a plurality of equally-spaced, radially-projecting notches 230, which are substantially larger than the slots 130 described above. The notches 230 help relieve forming stresses.

The invention claimed is:

1. A fastener, comprising:
 a dome-shaped head at a top end having a radially extending skirt with a downward extending periphery;
 a shank extending downward from the head, said shank having an elongate cylindrical upper portion and a shoulder;
 an undercut located immediately below the shoulder;
 an arcuate bulbous portion of the shank located immediately below the undercut at a bottommost end of the shank; and
 a central axial well extending from an opening at the top of the head to the bottom of the shank, said well having an internal pressing surface radially adjacent the undercut adapted to directly receive a pressing force from a punch.

2. The fastener of claim 1 wherein the skirt of the head is characterized by shape memory elasticity.

3. The fastener of claim 2 wherein the skirt is composed of a copper alloy which has high elasticity.

4. The fastener of claim 1 wherein the bottom of the head has a leading edge of greater diameter than the diameter of the shank.

5. The fastener of claim 1 wherein the skirt has a transverse planar base and an axially projecting rim on a downwardly folded periphery.

6. The fastener of claim 5 wherein the rim of the folded skirt periphery includes radially extending spaced slots open at the circumferential edge of the skirt and located between axially extending fingers of the skirt.

7. The fastener of claim 6 wherein the skirt has a tapered arcuate axial cross-section.

8. The fastener of claim 1 wherein the well is a substantially cylindrical blind bore closed at the bottom.

9. The Fastener of claim 1 composed of stamped sheet metal.

10. The fastener of claim 1 wherein said bulbous portion has an inwardly tapered surface at the bottom.

11. An assembly, comprising;
 a first top panel and a second bottom panel positioned face-to-face, each with an aligned aperture, said top panel aperture extending through to an opposite side of the panel;
 a fastener according to claim 1 extending through said top panel aperture, said fastener having a head with a skirt in contact with a top side of the first panel and having the shank extending into the bottom panel aperture and rigidly affixed to the second panel by the undercut which receives a cold flow of material from the second panel; and
 wherein the resilience of the skirt applies a residual clamp load to the panels joined thereby.

12. The assembly of claim 9 wherein the cold flow of second panel material is caused by a shoulder of the fastener shank which extends through the aperture in the first panel for the displacement of material of the second panel into the undercut.

13. The assembly of claim 12 wherein the head skirt has a downwardly folded periphery with spaced slots between downwardly extending fingers.

\* \* \* \* \*